(12) United States Patent
Wang et al.

(10) Patent No.: US 11,646,057 B2
(45) Date of Patent: May 9, 2023

(54) ESTIMATING RECORDING HEAD FLY HEIGHT USING MACHINE LEARNING (71) Applicant: Seagate Technology LLC, Fremont, CA (US)

(72) Inventors: Zheng Wang, Louisville, CO (US); Ara Patapoutian, Hopkinton, MA (US); Timothy F. Ellis, Tonka Bay, MN (US); Jason Bellorado, San Jose, CA (US); William M. Radich, Berthoud, CO (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 17/409,927

(22) Filed: Aug. 24, 2021

(65) Prior Publication Data
US 2023/0062615 A1 Mar. 2, 2023

(51) Int. Cl.
G11B 5/60 (2006.01)
G11B 20/12 (2006.01)
G11B 20/10 (2006.01)
G11B 5/596 (2006.01)
G11B 5/55 (2006.01)

(52) U.S. Cl.
CPC .......... *G11B 5/6029* (2013.01); *G11B 5/5565* (2013.01); *G11B 5/59622* (2013.01); *G11B 5/607* (2013.01); *G11B 20/10518* (2013.01); *G11B 20/1258* (2013.01)

(58) Field of Classification Search
None
See application file for complete search history.

(56) References Cited

U.S. PATENT DOCUMENTS

| 6,411,458 | B1* | 6/2002 | Billings | G11B 27/36 360/75 |
| 6,570,730 | B1* | 5/2003 | Lewis | G11B 5/483 29/603.04 |
| 7,253,984 | B1* | 8/2007 | Patapoutian | G11B 5/59688 360/75 |
| 7,839,595 | B1* | 11/2010 | Chue | G11B 5/6064 360/75 |
| 7,916,420 | B1* | 3/2011 | McFadyen | G11B 5/6064 360/75 |
| 8,254,051 | B2* | 8/2012 | Kuramoto | G11B 5/6064 360/75 |
| 8,320,069 | B1* | 11/2012 | Knigge | G11B 5/6011 360/75 |
| 9,159,348 | B2 | 10/2015 | Li et al. | |
| 10,311,905 | B1* | 6/2019 | Guo | G11B 5/40 |
| 2002/0164505 | A1* | 11/2002 | Yokoyama | G11B 5/74 |
| 2005/0088772 | A1* | 4/2005 | Baumgart | G11B 5/6005 |
| 2006/0146432 | A1 | 7/2006 | Khurshudov et al. | |
| 2007/0211368 | A1* | 9/2007 | Shibano | G11B 5/59688 360/77.02 |

(Continued)

*Primary Examiner* — Peter Vincent Agustin
(74) *Attorney, Agent, or Firm* — Mueting Raasch Group (57) ABSTRACT Two or more data values are received from one or more sensors of a hard disk drive. The two or more data values are indicative of a fly height of a recording head of the hard disk drive. The two or more data values are input into a machine-learning processor during operation of the hard disk drive. A fly height of the recording head during the operation of the hard drive head is adjusted based on an output of the machine learning processor.

18 Claims, 6 Drawing Sheets (56) References Cited

U.S. PATENT DOCUMENTS

| | | | |
|---|---|---|---|
| 2007/0230001 A1* | 10/2007 | Imamura | G11B 5/6064 360/31 |
| 2011/0317302 A1* | 12/2011 | Sakai | G11B 5/607 |
| 2012/0229928 A1* | 9/2012 | Sakai | G11B 5/6029 |
| 2014/0139940 A1* | 5/2014 | Ong | G11B 20/1217 360/39 |

* cited by examiner

| | $A < A_l$ | $A_l << A << A_h$ | $A > A_h$ |
|---|---|---|---|
| $y_1$ | 1 | 0 | 0 |
| $y_2$ | 0 | 1 | 0 |
| $y_3$ | 0 | 0 | 1 |

ESTIMATING RECORDING HEAD FLY HEIGHT USING MACHINE LEARNING

SUMMARY

The present disclosure is directed to estimating recording head fly height using machine learning. In one embodiment, a method involves receiving two or more data values from one or more sensors of a hard disk drive. The two or more data values are indicative of a fly height of a recording head of the hard disk drive. The two or more data values are input into a machine-learning processor during operation of the hard disk drive. A fly height of the recording head during the operation of the hard drive head is adjusted based on an output of the machine learning processor.

In another embodiment, a method involves training a machine learning model using a plurality of test drives over a range of operating conditions. The machine learning model predicts a fly height of the plurality of test drives based on two or more different measurements made in the plurality of test drives in the range of operating conditions. The two or more different measurements provides two or more corresponding data streams that are input to the machine learning model during the training. The machine learning model is transferred to a machine learning processor of a fieldable drive. The machine learning model is additionally trained within the fieldable drive based on the two or more different measurements made in the fieldable drive.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to data storage devices such as hard disk drives (HDDs). These drives stored data by applying a changing magnetic field from a recording head to the surface of a magnetic disk that is moving relative to the head. A recording head generally includes a read transducer, e.g., magnetoresistive (MR) sensors that can read back the recorded data by translating the changing magnetic fields to analog electrical signals. The analog electrical signals are processed and conditioned, converted to digital data, and decoded to recover the stored data, which can then be sent to a requestor, e.g., a host computer, an internal controller, etc.

The recording head also usually includes write transducers, such as a write coil and write pole that apply a changing magnetic field to the disk surface. The magnetic components can be used by themselves for recording, an arrangement known as conventional magnetic recording (CMR). In some cases, the heads can use energy assistance adds energy to the magnetic recording process and allows increased areal density capacity (ADC) of the drives. Examples of energy assisted recording include heat-assisted magnetic recording (HAMR) and microwave-assisted magnetic recording (MAMR).

Whatever technology is used to record the data, the head will be configured to float over the disk surface, which is usually accomplished by air-bearing features of the recording head (e.g., air-bearing surface, or ABS). The ABS causes the head to be separated from a thin layer of air or other gas (e.g., helium) that moves with the surface of the disk as it rotates. The head further includes an actuator that provides fine control of the clearance between particular transducers (e.g., read and write transducers) and the disk surface. For example, a heating element can be embedded in the head near the ABS. Applying current to the heating element can induce local thermal protrusion in a region surrounding the element, which can selectably change a local clearance at the region.

For purposes of this disclosure, the terms "clearance," "fly height," "head-to-media spacing," etc., refer to the actively controllable distance between a region of the head (e.g., transducer at the ABS) and not the air-bearing separation, which for these purposes may be assumed predetermined for a given disk rotation speed, head geometry, surrounding gases, etc. The actively-controller clearances can be affected by a heater embedded in the head near the ABS, however the concepts described herein may apply to other mechanisms that may be used to provide active clearance control, such as piezo actuators, micro electromechanical systems (MEMs), etc.

Fly height plays an important role during the read/write process. During writes, if the write transducer flies too high, it causes weak writes that are associated with low signal-to-noise ratio (SNR). Similarly, if the read transducer flies too high, the SNR of the readback signal goes down. When either the write or the read transducer flies too low, it can potentially crash into the media and damage the transducer, head, and/or media. In general, the write process is less tolerant of failure than the read process. A reread operation can be repeated when a sector read operation fails, but once data is written (and assumed to be reliable, e.g., if performed without a verifying read after write), the write operation cannot be repeated.

Fly height control has become more challenging over the years. In present HDD devices, the head-media spacing has been reduced to few angstroms, which requires a high resolution in estimating the head-to-media spacing. The signal/metrics used to infer fly-height are usually very weak (e.g., quite noisy). Finally, fly height estimation is sensitive to other nuisance parameters, such as temperature variations, disk radial position, recorded bit density etc.

Currently, fly-height is calibrated during manufacturing, such as by using a harmonic ratio measurement (HRM), in which a specific known data pattern is written and readback. The ratio of two specified harmonics is used to indicate fly height. At a given temperature fly height is adjusted to (or near) zero, also referred as touch down. The HRM variation is observed by backing fly height away from the zero point. This can be done by adjusting a heater digital-to-analog converter (DAC) value which controls the temperature around the head and therefore controls the protrusion of the head towards the media. This process is run for a range of temperatures in order to capture the dynamics between heat DAC values and fly height, for various temperature values.

Some signal patterns are often written at certain dedicated area on the disk for periodic in field calibration. To perform these field calibrations, the drive goes offline to read back these signals and tune the dynamic between heater DAC and fly height for a given temperature. These observed dynamics are then used for in-drive operation to adjust the heat DAC values (and hence the fly height) according to temperature changes sensed by some temperature sensor. The in-drive fly height adjustment is therefore an open-loop heater control based on observed temperature.

Due to this open-loop aspect of current fly height control, the instantaneous fly height is not observable. If, for example, the drive ever gets into a state where the calibrated values are not consistent with the actual fly height, this would not be known until the next calibration. It would be beneficial to have a real-time fly height monitoring system, which provides in-time feedback on the fly height changes.

In embodiments described below, a machine learning (ML) apparatus, such as a neural network, is proposed to estimate real-time fly-height more accurately. The machine learning process can more effectively utilize a multitude of relevant parameters that may not be amenable to algorithmic or rule-based techniques. Furthermore, by increasing the fly-height estimate accuracy, such an apparatus would allow for an on-the-fly usage (e.g., closed control loop) of fly-height estimation rather than an offline approach. The fly height can be estimated and adjusted quite frequently, e.g., one or more times per track, etc.

Figure 1:
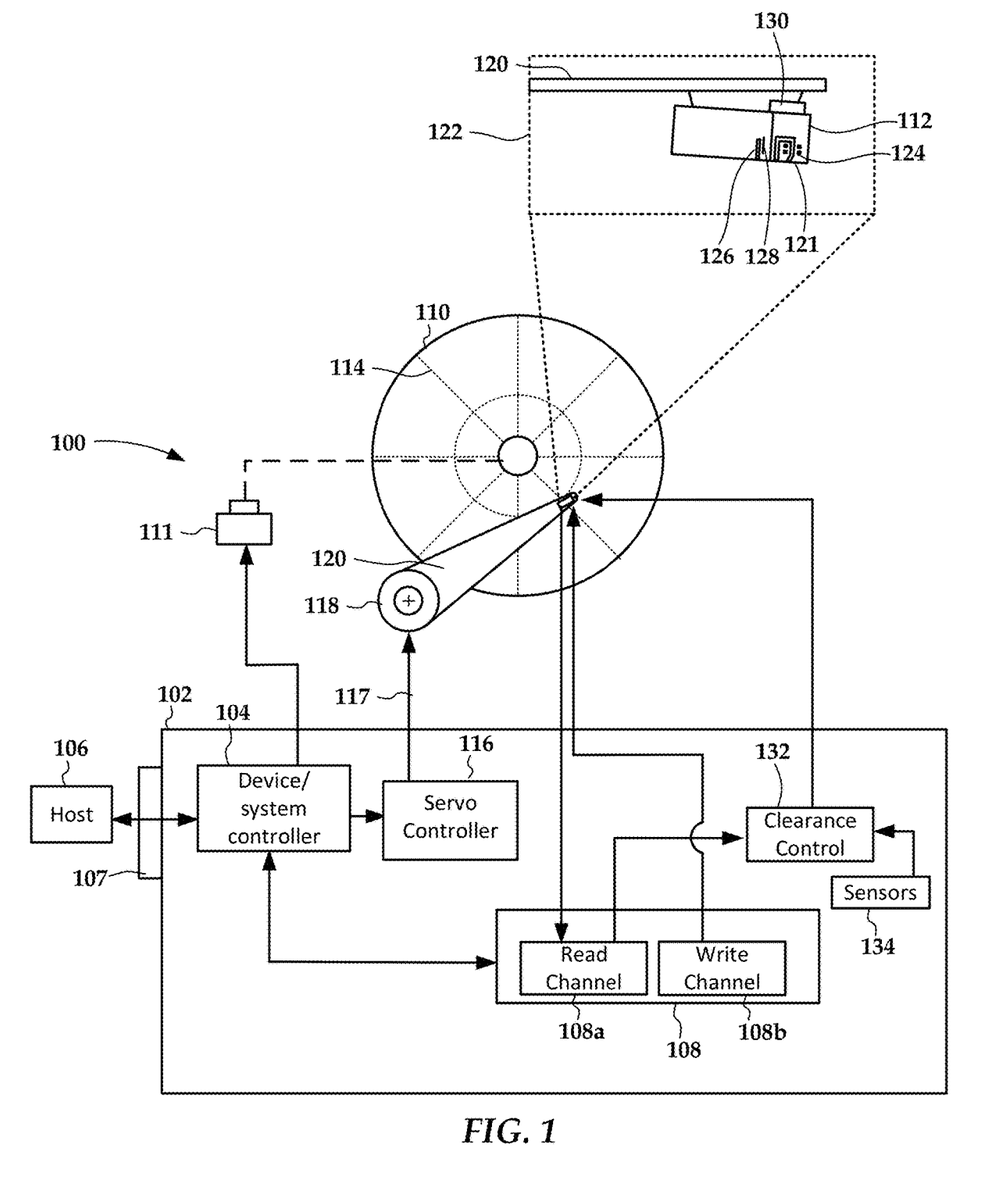
FIG. 1 is a block diagram of a data storage device according to an example embodiment.

In order to understand the context in which an ML clearance control system may operate, FIG. 1 illustrates a block diagram a data storage apparatus 100 (e.g., HDD) according to an example embodiment. The apparatus 100 includes circuitry 102 such as one or more device/system controllers 104 that process read and write commands and associated data from a host device 106 via a host interface 107. The host interface 107 includes circuitry that enables electronic communications via standard bus protocols (e.g., SATA, SAS, PCI, NVMe, etc.). The host device 106 may include any electronic device that can be communicatively coupled to store and retrieve data from a data storage device, e.g., a computer, a server, a storage controller. The system controller 104 is coupled to one or more read/write channels 108 (shown here as separate read channel 108a and write channel 108b) that read from and write to a recording media, which in this figure are surfaces of one or more magnetic disks 110 that are rotated by a spindle motor 111.

The read/write channels 108 generally convert data between the digital signals processed by the device controller 104 and the analog signals conducted through one or more heads 112 during read and write operations. As seen in detail view 122, each head 112 may include one or more read transducers 126 each capable of reading one surface of the disk 110. The head 112 may also include respective write transducers 124 that concurrently write to the disk 110. The write transducers 124 may be configured to write using an energy source (e.g., laser 130 for a HAMR device), and may write in various track configurations, such as conventional tracks, shingled magnetic recording (SMR), and interlaced magnetic recording (IMR).

The read head 112 is also shown with a clearance actuator, here shown as a heater 128 located proximate an ABS 121 of the head 112. The heater 128 may include a resistance and/or inductive heater, and more than one heater 128 may be used. Also note that in addition to the heater 128, the write transducer 124 and laser 130 (if used) can also contribute to heating of the head 112, resulting in write protrusion that can decrease fly height in addition to the protrusion induced by the heater 128.

The read/write channels 108 may include analog and digital circuitry such as digital-to-analog converters (DACs), analog-to-digital converters, detectors, decoders, timing-recovery units, error correction units, etc. The read/write channels 108 are coupled to the heads 112 via interface circuitry that may include preamplifiers, filters, etc. A separate read channel 108a and write channel 108b are shown, although both may share some common hardware, e.g., digital signal processing chip.

In addition to processing user data, the read channel 108a reads servo data from servo marks 114 on the magnetic disk 110 via the read/write heads 112. The servo data are sent to one or more servo controllers 116 that use the data (e.g., frequency burst patterns and track/sector identifiers embedded in servo marks) to provide position control signals 117 to one or more actuators, as represented by voice coil motors (VCMs) 118. In response to the control signals 117, the VCM 118 rotates an arm 120 upon which the read/write heads 112 are mounted. The position control signals 117 may also be sent to microactuators (not shown) that individually control each of the heads 112, e.g., causing small displacements at each read/write head.

The signals processed via the read channel 108a can also be used by a clearance controller 132. As described in greater detail below, both servo data and user data may provide information indicative of reader clearance. The clearance controller 132 receives data from the read channel 108a, and can also collect data from one or more sensors 134, e.g., a temperature sensor. The clearance controller 132 uses an ML module to process these various inputs and provides an output to the head heaters 128 (or other clearance actuators) to adjust fly height. Note that these clearance signals may be tailored for each one of the heads 112 and may also be changed based on whether the head 112 is in a read or write mode, e.g., due to difference in position between the read and write transducers, as well as additional heat generated during writing. In some cases, different actuators may be used depending on the read/write mode, e.g., the head 112 may have a dedicated read heater and a dedicated write heater.

In this disclosure, a number of parameters may be considered for fly-height estimation using machine learning. One of these parameters is the signal content of a readback signal, such as the frequency content of the servo address mark (SAM) field. The theory behind estimation of fly height based on SAM is described further below. Another set of attributes that are known to affect fly height are the radial position of the head, which can be represented as track and/or zone identifiers/numbers. The track number is related to head skew and the zone number can provide linear density information, which can change from zone-to-zone. Both skew and linear density can have subtle effects on fly height.

Various temperature sensors may be available on a drive, and so one or more of these temperature measurements may be used to estimate fly height. Since increased temperature in the head surroundings causes protrusion of the head towards the media, temperature provides independent information on fly-height. Another parameter than may be indicative of fly height is the automatic gain control (AGC) value. The AGC value is correlated to a fixed component of readback signal and provides useful information on fly-height. However, other factors such as squeezed tracks also influence the AGC value and making a fly-height estimate solely based on AGC could be misleading. Finally, since different heads have different characteristics, e.g., due to manufacturing tolerances, the specific head characteristics should be incorporated into the fly height estimation. This can be accomplished using a different label for each head, e.g., 0, 1, 2, etc.

Next, the first two parameters listed above are discussed in more detail, starting with the SAM. The frequency response of a readback signal is a function of multiple factors such as recorded data pattern, recorded linear density, head characteristics, fly-height, etc. To extract fly-height information reliably, what is needed is to observe the frequency response change due to only fly-height, while compensating for the other changes, or keeping all other factors constant.

As pointed out in "Using Servo Data Harmonics to Monitor Head-Medium Spacing" (U.S. Pat. No. 7,948,704), servo signals can be used for monitoring fly height. In a hard disk drive, servo wedges are evenly distributed over the disk to provide positioning and/or coordination information. Unlike data sectors, servo wedges are read during both read and write processes, and therefore can be used for fly height estimation during both read and write processes. Each track usually contains hundreds of servo wedges; and each servo wedge contains multiple fields, such as preambles, servo timing mark, position error signals etc.

Servo timing data is contained in all servo wedges as discussed above, and usually in two forms: servo address mark (SAM) and servo index mark (SIM). Throughout a track, only one servo wedge contains SIM and all others contains SAM. The SAM signal does not vary from one wedge to the next, or over different radial locations. As a result, SAM provides a stable field over which fly-height can be computed since the signal pattern is constant throughout the disk. Some other servo fields may also carry similar characteristic, such as preamble. However, the preamble is not as spectrally rich as SAM, the spectral data being a useful characteristic in fly height estimation.

Figure 2:
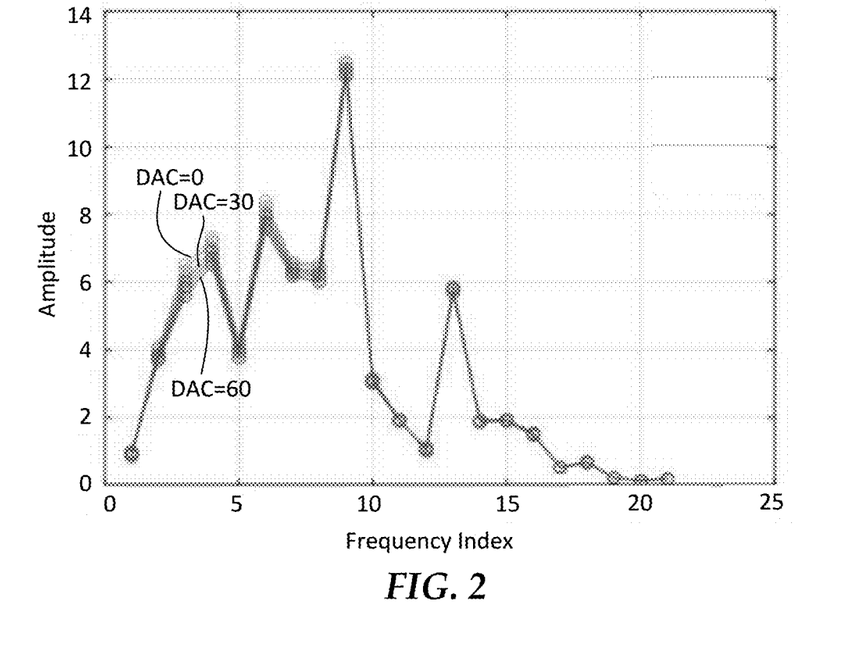
FIGS. 2 and 3 are graphs showing how servo address mark data can be used to estimate fly height in some embodiments.

The readback signal from a SAM contains fly-height information as shown in the graph of FIG. 2, where the frequency domain SAM samples with respect to different fly heights are plotted. The x-axis in FIG. 2 is the frequency component index, and y-axis is the frequency amplitude. Select ones of the curves are labeled with the heat digital-to-analog converter (DAC) values. A heater DAC value of 0 corresponds to passive fly height, in other words the fly height value associated with no heat application. Fly height decreases as the heater DAC value increases. There are seven plots total in FIG. 2 corresponding to DAC values between 0 and 60, and the amplitudes change inversely to the DAC. This shows that the frequency amplitude of SAM signals changes with respect to fly height, especially at low frequency. The fly height information contained in SAM signals can therefore be used for fly height estimation.

It is common to compute fly-height from two frequency components of the signal. However, as seen from FIG. 2, more than two frequencies appear to exhibit significant change responsive to heater DAC changes. As many as seven or eight frequency indices in this example appear to have detectable change in response to heater DAC. Therefore, it may be useful to extract information from all relevant frequency components, e.g., the lowest five or six frequencies, or even more. Furthermore, it may be beneficial to extract features and provide such features to the ML apparatus. For example, instead of providing frequency components, the normalized frequency components may be fed into the ML apparatus, such as frequency components (e.g., amplitudes) normalized with respect to a reference fly height frequency component/amplitude.

Figure 3:
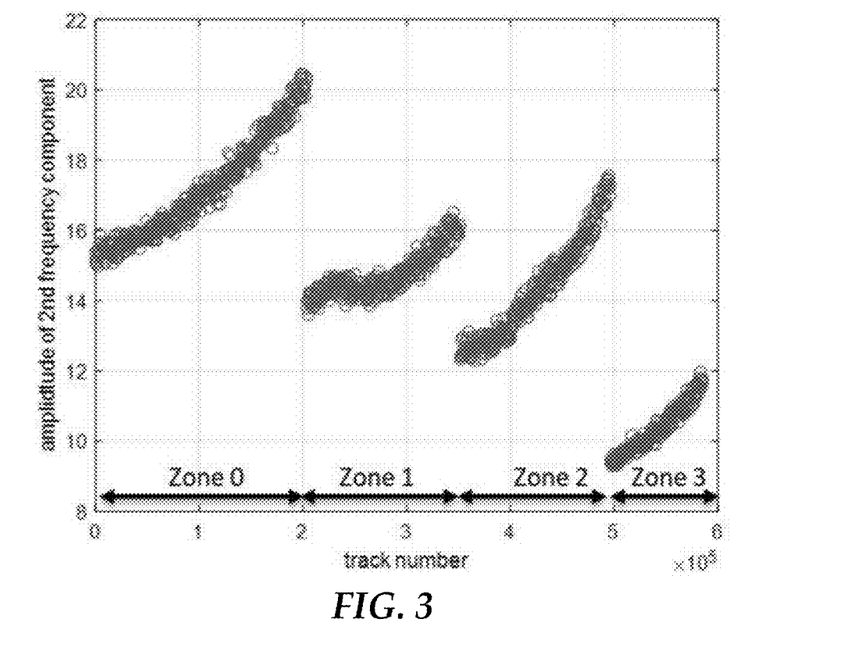

The second input parameter for fly height control that is described in more detail is radial location of the head on the disk. Both radial location and fly-height change the readback pulse width of a signal. As a result, the frequency response of SAM signal is not only sensitive to fly height, but also to the radial location of the current head. As an example, the graph in FIG. 3 shows that for a given fly height, the amplitude of a frequency component changes with respect to the servo track number which increases from outer diameter (OD) toward inner diameter (ID) of the disk. Therefore, the track identifier, which indicates the current radial position of the recording head, can be taken into consideration when using SAM signals to estimate fly height.

The radial location of a track is carried in servo track number, as well as servo zone number. Usually, the range of servo tracks are broken into multiple (for example, four) zones, where the same data rate is used throughout a single zone. Moving from the ID to the OD of the zone, the media is spinning progressively faster and, thus, due to the fixed clock-rate, the channel bit density is decreasing. Since modulation of channel bit density changes the signal characteristics in a similar manner as does changes in fly-height. Providing zone number to the ML clearance controller allows it to separate these factors. The four servo zones partitions from the tested drive are shown in FIG. 3.

Figure 4:
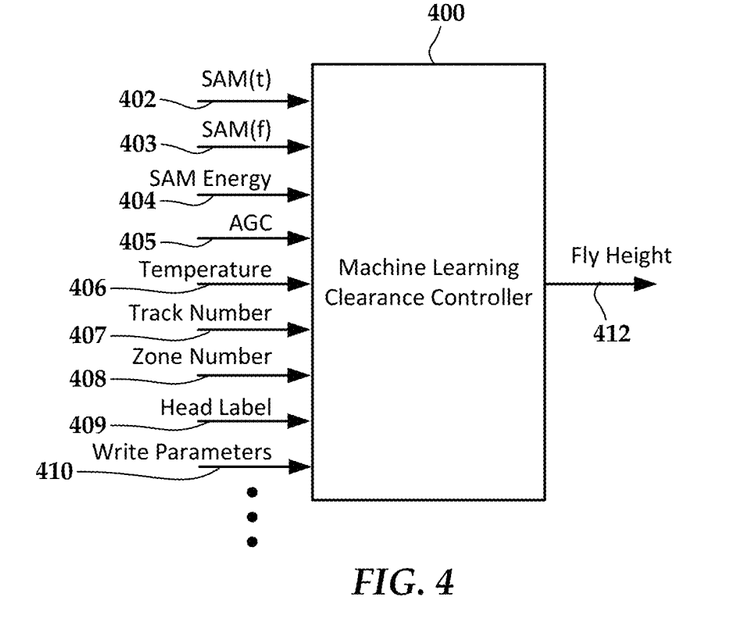
FIG. 4 is a block diagram showing a machine learning clearance controller according to an example embodiment.

As discussed earlier, the aforementioned signals/parameters carry diverse fly height information. It is challenging to design rule-based estimation apparatus which incorporates a multitude of such diverse inputs and to take full advantage of available information. A machine learning apparatus, on the other hand, is capable of extracting such information from multiple inputs without specifying explicit rules. In FIG. 4. a block diagram shows a general structure of fly height estimation using a machine learning controller apparatus 400 according to an example embodiment.

Multiple inputs may be used, such as SAM signal in the time domain 402, SAM signal in the frequency domain 403, SAM signal energy 404, AGC 405, temperature sensor values 406, track number 407, zone number 408, and head label 409. Note that the inputs can be a single value or a vector of values. For example, the SAM signal in the frequency domain 403 could be a vector of values indicating an actual or normalized amplitude for different frequencies.

Also shown are write parameters 410, which can affect protrusion-induced clearance while writing due to heating of the magnetic writer and optics in the case of a HAMR drive. The clearance actuator will be set to different values depending on whether the head is in read or write mode. This difference is due to the physical offset between read and write transducers, as well as the additional heating during writing. The differences can be determined during drive qualification. However, certain conditions that occur during writing, such as the patterns being written, adjustments to field strength and laser power, etc., can also affect fly height. These affects can also be determined during training of the machine learning controller (e.g., in qualification testing) and used during writing, together with the other parameters 402-409. The write parameters 410 would not be considered by the machine learning controller 400 during read operations.

Some combination of the inputs 402-410 are input to the machine learning clearance controller 400, which provides an output 412 indicative of fly height. This output 412 could take a number of forms. In one embodiment, the output 412 could be a single value that indicates an actual measurement of fly height, e.g., between 0 to X μm. In another embodiment, the output could indicate an offset from the desired fly height, e.g., ±Y μm. These values could be in actual units, or scaled, normalized or otherwise converted. In another embodiment, the output 412 could include an actuator input value, e.g., a DAC value input to a heater driver or an offset thereof. In other embodiments, the output 412 could include multiple values, such as the probability that the fly height is within different ranges. More details of these embodiments are described below.

Figure 5:
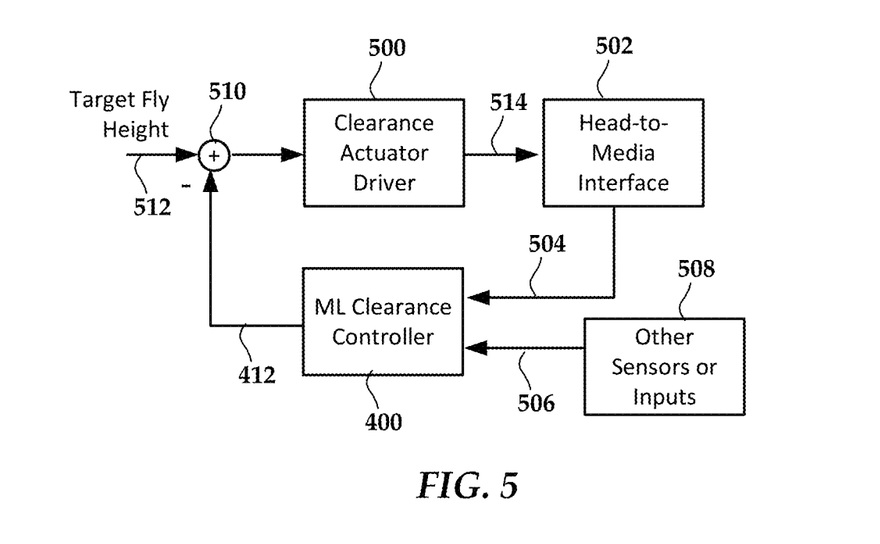
FIG. 5 is a block diagram of a clearance control system according to an example embodiment.

In FIG. 5, a diagram shows how the machine learning clearance controller 400 may be used in a clearance control loop according to an example embodiment. The system includes a clearance actuator driver 500 that outputs an electrical signal used to drive the clearance actuator (e.g., heater), which is part of the physical head-to-media interface 502. Some indications of current fly height can be determined from the readers, as indicated by signal 504 which is output from the head-to-media interface 502 and input to the machine learning clearance controller 400. These signals may include SAM spectral data, ADC, and track/zone identifiers. Other signals 506 may also be used that do not originate from the head-to-media interface 502, shown here as other sensors or inputs 508. These signals 506 may include temperature sensor readings, writer inputs, head identifier, etc. Generally, the inputs 504, 506 may include any combination of inputs 402-410 shown in FIG. 4.

The clearance actuator 500 in this example converts a target fly height 512 to an output value 514, e.g., voltage, current, pulse width, etc. Thus, the output 412 from the ML clearance controller 400 can be used to adjust this value via summation block 510. the clearance actuator driver 500 may receive other inputs to change the transfer function between inputs and outputs. For example, the clearance actuator driver 500 may have different transfer functions for read and write mode. Note that a control system may be configured differently from what is shown, and may include additional components known in the arts, such as filters, converters, etc.

Figure 6:
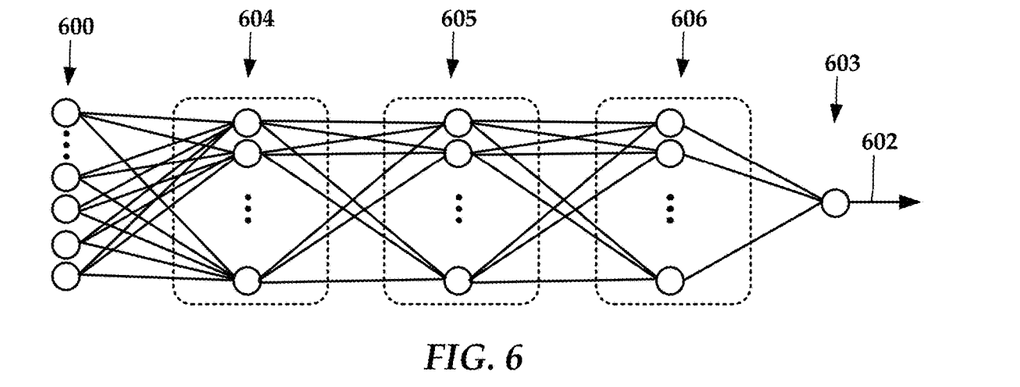
FIG. 6 is a diagram showing a neural network used by a clearance controller according to an example embodiment.

One option for machine learning controller apparatus 400 is a neural network. The block diagram in FIG. 6 shows a fly height estimation neural network according to an example embodiment. It is a fully connected feedforward neural network, with N inputs 600, one output 602 from output layer 603, and three hidden layers 604-606, with ten nodes in each layer. Mean square error (MSE) can be used as cost function. For the hidden layers 604-606, rectified linear unit (ReLU) can be used as activation functions, and for output layer 603, a linear activation function can be applied. The Adam optimizer (which is an extension to stochastic gradient descent) can be used with L2 regularization.

The training process for neural network involves preparing training data. The data is collected over different heads at various known fly-heights and radial locations. For example, this can be done by collecting the data while HRM fly height measurements are performed, which will provide both the relevant machine learning inputs and target outputs. The input of the neural network can be chosen from the previously listed metrics/parameters, and the target of the neural network is labeled with the fly height values (e.g., in angstroms or heat DAC values). Hyper-parameter tuning for the neural network is also defined, in terms of choice of various functions (e.g., cost function, activation function, optimizer, etc.), training epochs, and learning rate, etc. The trained neural network can be applied for fly height estimation. Although a neural network is shown as an example of a machine learning clearance controller, other machine learning structures could be used instead of or in addition to a neural network, such as Bayesian networks, support vector machines, etc. Also, different neural network structures may be used different than what is shown in FIG. 6, including different numbers of nodes and hidden layers.

Figure 7:
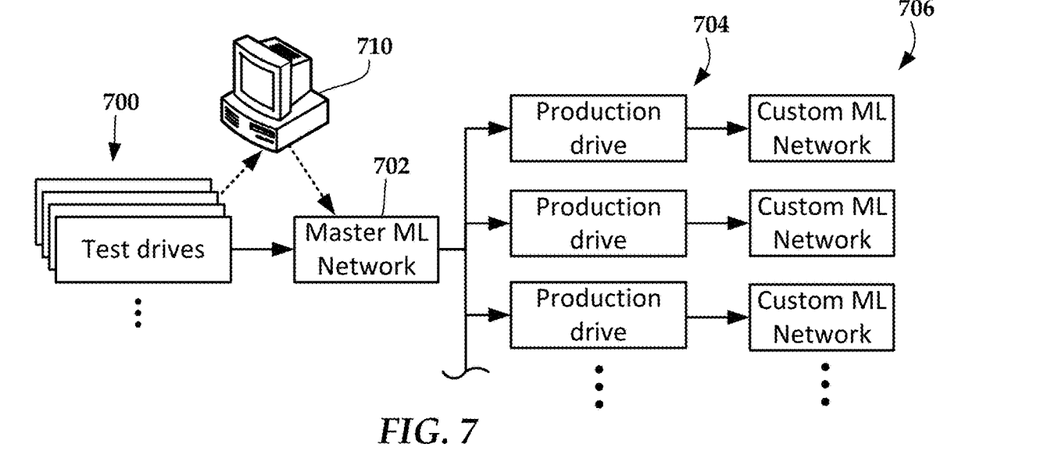
FIG. 7 is block diagram showing training of a machine-learning clearance controller according to an example embodiment.

The training of such a network can be achieved in two phases, as shown by the example embodiment of FIG. 7. A master ML network 702 could be trained off-line for an HDD product line. Note that the use of the term "network" in FIG. 7 is not intended to limit the example to neural networks, as a similar process may be used for other machine learning models. The ML network 702 can be trained, for example, over hundreds of test drives 700 under different environment conditions. An offline machine, e.g., high-powered computer 710 using specialized machine learning hardware (e.g., tensor processing units, graphical processing units) can perform the training using the data gathered from all of the drives 700, e.g., into a single database.

For each fieldable production drive 704, a fine-tuned, per-drive ML network 706 is prepared, whose initial parameters include the master ML network 702. Fine tuning involves additional training using data collected from just the production drive 704. Note that since the ML network 702 is presumable already close to a desired state for any of the production drives 704, this additional training is much less processor intensive. This additional training could be performed during manufacturing, and/or in the field, and can be customized for each head in the drives 704. For example, an external high-power computer (e.g., computer 710) could be used to perform the additional training, which could significantly reduce processing time in the factory. The fielded drive 704 may have to perform any additional training on its own, which could be done during idle time of the drive 704, for example.

Figure 8:
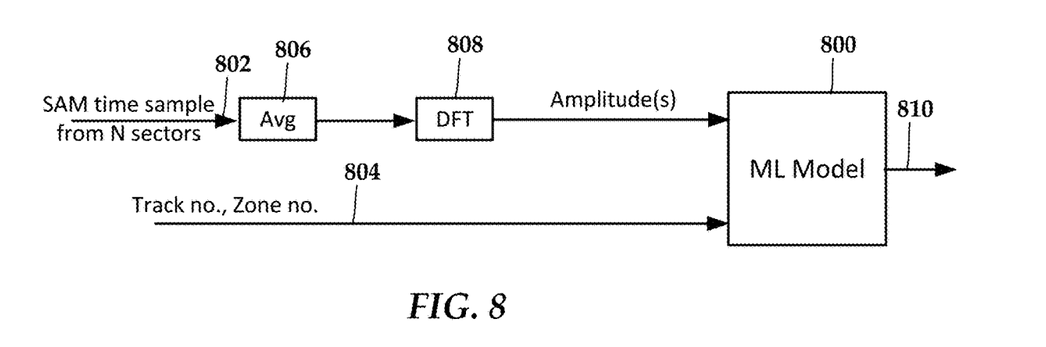
FIG. 8 is a block diagram showing a machine learning clearance controller according to another example embodiment.

While the previous example showed a large number of inputs, in FIG. 8, a diagram shows an ML model 800 (e.g., neural network) that works with a specific subset of those inputs and includes other data processing features according to an example embodiment. In this configuration, the SAM time domain samples 802 from adjacent N sectors are averaged (e.g., recursively or within a window) as indicated by averaging block 806. Note that, the signals can also be averaged in frequency domain or in both domains. Averaging the readback signal from adjacent servo sectors help improve the SNR at the expense of tracking bandwidth (e.g., reduces the response time of the controller). The averaged samples are converted to frequency domain using a discrete Fourier Transform (DFT) block 808. The DFT values are extracted and fed into a trained neural network to, together with track and zone numbers 804. Because the track and zone numbers 804 are "clean," index values, they do not need any preprocessing like the noisier SAM samples 802. The output 810 of the ML model 800 can be used for fly height detection, e.g., in a control loop as shown in FIG. 5. Note that inputs 403-410 as shown in FIG. 4 that are not already shown in FIG. 8 may be additionally used as inputs to the model shown in FIG. 8.

In some applications, the interest may not lie in the absolute value of the fly height, but in the detection of head going too close or too far from the media. In such cases, the output of the above neural network can be used to compare with one or more thresholds (boundaries) in order to detect anomaly in one or both directions. In such an embodiment, a lower threshold Ai is set for detecting when the head flies too low and a higher threshold $A_h$ is set for detecting when the head flies too high. Let $\hat{A}$ represent the output of neural network. If $\hat{A} < A_l$, a low fly height is triggered to warn about potential crash. Similarly if $\hat{A} > A_h$, a high fly height alert is triggered to warn about potential weak read/write.

Figure 9:
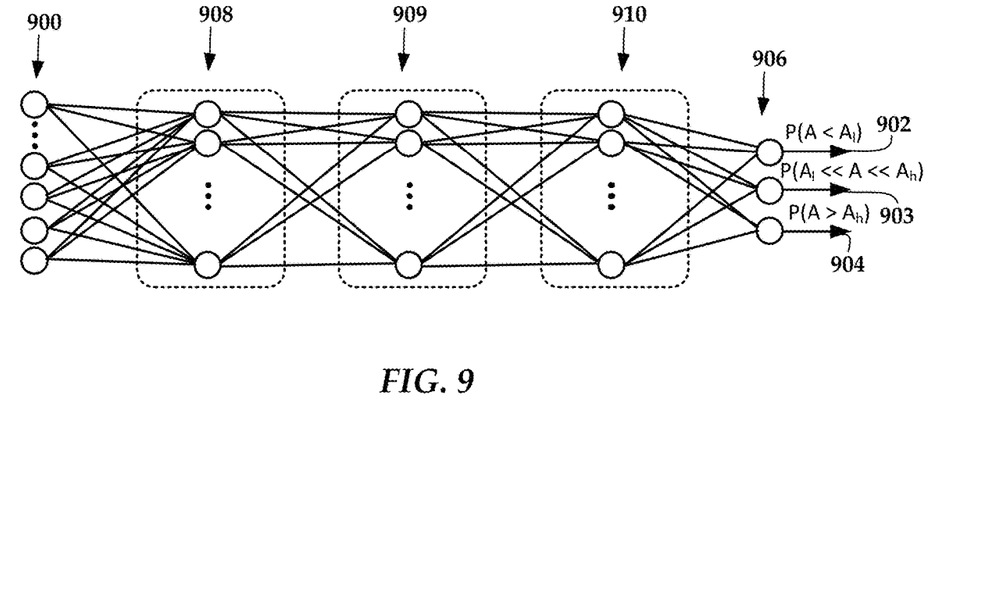
FIG. 9 is a diagram showing a neural network used by a clearance controller according to another example embodiment.

Another approach is to directly perform a hypothesis testing on whether a fly-height is too close or too far from the media. The classification is performed inside the ML apparatus (rather than the regression neural network described above and followed by a threshold). In FIG. 9, a block diagram illustrates a neural network with multiple outputs according to another example embodiment. As with the example of FIG. 6, the example in FIG. 9 is a fully connected feedforward neural network, with N inputs 600 and three hidden layers 908-910, with ten nodes in each layer. Unlike the example in FIG. 6, this network has three output nodes 902-904 in output layer 906, Each output node 902-904 generates the probability of head flying too low (output 902) or too high (output 904) or within the range (output 903).

Figure 10:
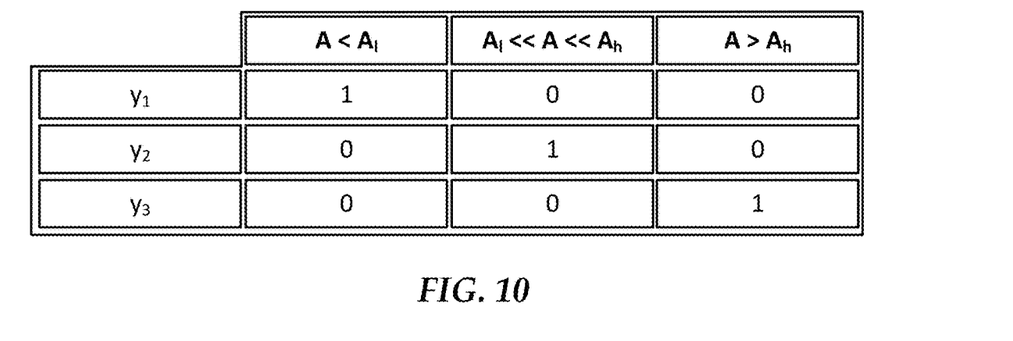
FIG. 10 is a table showing a one-shot vector used in training the neural network of FIG. 9.

Some hyperparameters and functions may change in the implementation shown in FIG. 9. For example, the activation function may use the softmax function, and the cost function may use cross entropy. To train the neural network, the data is still collected over different heads at various known fly-heights and radial locations. However, the target is a one-hot vector $y=[y_1, y_2, y_3]$. The value of the vector y is shown in the table of FIG. 10 and depends on the relationship among the known fly height at which the data was collected and the two thresholds, $A_l$ and $A_h$.

Figure 11:
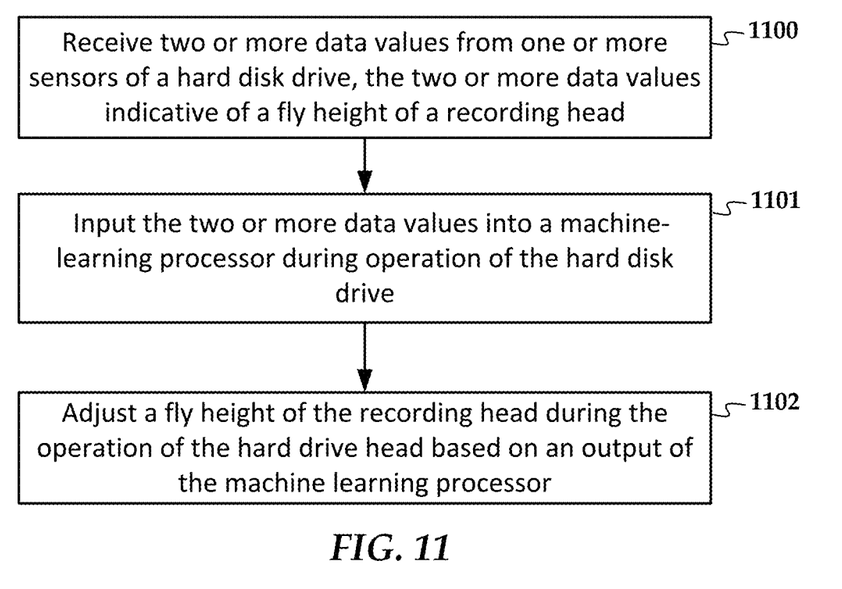
FIGS. 11 and 12 are flowcharts of methods according to example embodiments.

In FIG. 11, a flowchart illustrates a method according to an example embodiment. The method involves receiving 1100 two or more data values from one or more sensors of a hard disk drive. The two or more data values are indicative of a fly height of a recording head of the hard disk drive. The two or more data values are input 1101 into a machine-learning processor during operation of the hard disk drive. A fly height of the recording head is adjusted 1102 during the operation of the hard drive head based on an output of the machine learning processor.

Figure 12:
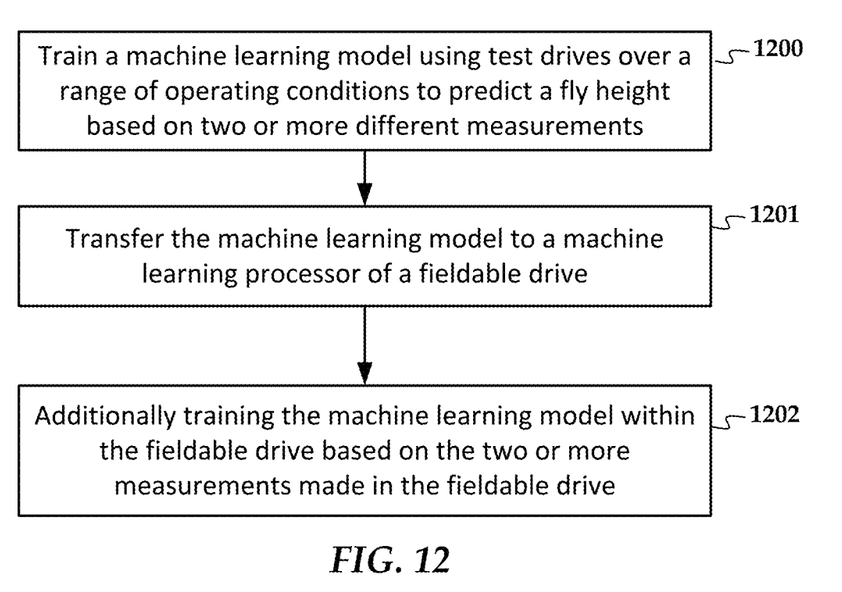

In FIG. 12, a flowchart illustrates a method according to another example embodiment. The method involves training 1200 a machine learning model for a plurality of test drives over a range of operating conditions. The machine learning model predicting a fly height of the plurality of test drives based on two or more different measurements made in the plurality of production drives in the range of operating conditions. The two or more different measurements providing two or more corresponding data streams that are input to the machine learning model during the training. The machine learning model is transferred 1201 to a machine learning processor of a fieldable drive. The machine learning model is additionally trained 1202 within the fieldable drive based on the two or more different measurements made in the fieldable drive. This additional training 1202 uses the same type of training as in block 1200, but the measurements are specific to each disk drive, thus the machine learning model in each drive will be custom-tuned to that drive's characteristics.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    receiving two or more data values from one or more sensors of a hard disk drive, the two or more data values indicative of a fly height of a recording head of the hard disk drive;
    inputting the two or more data values into a machine learning processor during operation of the hard disk drive, wherein the machine learning processor provides two or more outputs indicative of two or more probabilities that the fly height is respectively within two or more different ranges; and
    adjusting the fly height of the recording head during the operation of the hard disk drive based on an output of the machine learning processor.

2. The method of claim 1, wherein the two or more data values comprise two or more frequency components of a servo address mark signal.

3. The method of claim 2, wherein the method further comprises averaging time domain samples read from the servo address mark signal, the two or more frequency components obtained by transforming the averaged time domain samples into a frequency domain.

4. The method of claim 2, wherein the two or more frequency components of the servo address mark signal comprise three or more frequency components of the servo address mark signal.

5. The method of claim 1, wherein the two or more data values comprise an automatic gain control signal.

6. The method of claim 1, wherein the two or more data values comprise an indicator of radial position of the recording head over a disk surface.

7. The method of claim 1, wherein the two or more data values comprise a temperature measurement.

8. The method of claim 1, wherein the machine learning processor comprises a feedforward neural network.

9. The method of claim 8, wherein the feedforward neural network provides a single output indicative of at least one of:
the fly height; and
an adjustment to a fly height estimate obtained by a fly height controller.

10. A hard disk drive comprising a controller coupled to the recording head, the controller operable to perform the method of claim 1.

11. A method, comprising:
receiving two or more data values from one or more sensors of a hard disk drive, the two or more data values indicative of a fly height of a recording head of the hard disk drive;
inputting the two or more data values into a machine learning processor during operation of the hard disk drive, wherein the two or more data values comprise an indicator of a radial zone in which the recording head is located, the radial zone indicative of a bit density of data read by the recording head;
adjusting the fly height of the recording head during the operation of the hard disk drive based on an output of the machine learning processor.

12. A method, comprising:
measuring at least one of a servo address mark signal and an automatic gain control signal to determine a first data value indicative of fly height of a recording head over a disk surface of a hard disk drive;
determining a second data value indicative of the fly height based on an indicator of a radial position of the recording head over the disk surface;
inputting the first and second data values into a machine learning processor during operation of the hard disk drive; and
adjusting the fly height of the recording head during the operation of the hard disk drive based on an output of the machine learning processor.

13. The method of claim 12, wherein the first data values comprises two or more frequency components of the servo address mark signal.

14. The method of claim 12, wherein the indicator of the radial position of the recording head over the disk surface comprises an identifier of a track on which the recording head is currently located.

15. The method of claim 12, wherein the indicator of the radial position of the recording head over the disk surface comprises an indicator of a radial zone in which the recording head is located, the radial zone indicative of a bit density of data read by the recording head.

16. The method of claim 12, further comprising measuring temperature data of the hard disk drive and inputting the temperature data into the machine learning processor during the operation of the hard disk drive.

17. The method of claim 12, wherein the machine learning processor comprises a feedforward neural network, and wherein the feedforward neural network provides a single output indicative of at least one of: the fly height; and an adjustment to a fly height estimate of a fly height controller.

18. The method of claim 12, wherein the machine learning processor comprises a feedforward neural network, and wherein the feedforward neural network provides two or more outputs indicative of two or more probabilities that the fly height is respectively within two or more different ranges.

* * * * *